2 Sheets—Sheet 1.

S. D. PURDY,

Assignor, by Mesne Assignments, to THE WASHBURN & MOEN MANUFACTURING CO.

Bale-Tying Attachment for Baling-Press.

No. 8,828. Reissued July 29, 1879.

Witnesses:

W L Fay

C. H. Crapton

Inventor:

Stacy D. Purdy

2 Sheets—Sheet 2.
S. D. PURDY,
Assignor, by Mesne Assignments, to THE WASHBURN & MOEN MANUFACTURING CO.
Bale-Tying Attachment for Baling-Press.
No. 8,828. Reissued July 29, 1879.
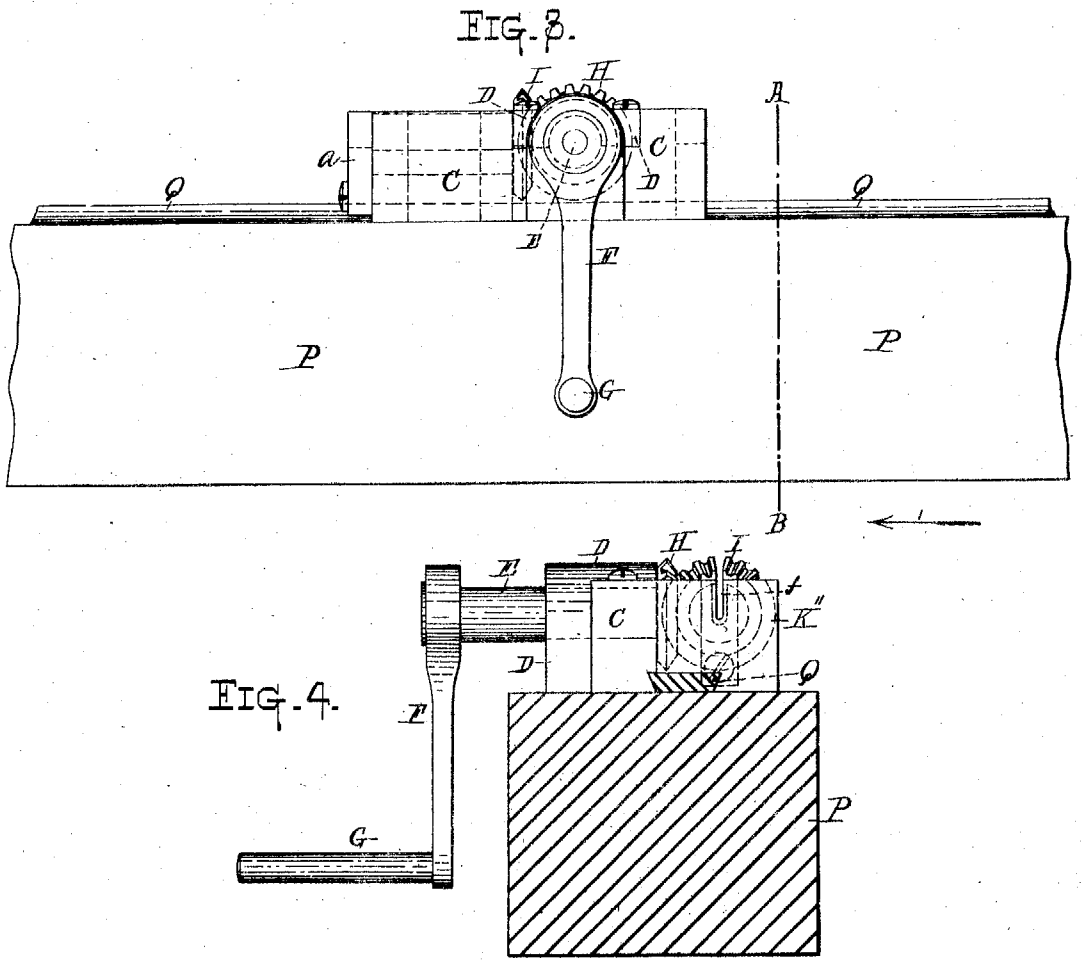
FIG. 5.
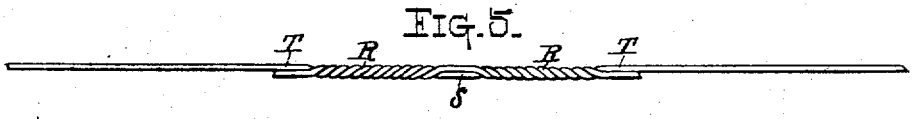
Witnesses:
W. L. Fay.
C. H. Boynton
Inventor:
Stacy D. Purdy

UNITED STATES PATENT OFFICE.

STACY D. PURDY, OF ELYRIA, OHIO, ASSIGNOR, BY MESNE ASSIGNMENTS TO THE WASHBURN & MOEN MANUFACTURING COMPANY, OF WORCESTER, MASSACHUSETTS.

IMPROVEMENT IN BALE-TYING ATTACHMENTS FOR BALING-PRESSES.

Specification forming part of Letters Patent No. 180,788, dated August 8, 1876; Reissue No. 8,828, dated July 29, 1879; application filed July 7, 1879.

*To all whom it may concern:*

Be it known that I, STACY D. PURDY, formerly of Cleveland, Ohio, but now of Elyria, in the county of Lorain and State of Ohio, have invented a new Bale-Tying Attachment for Baling-Presses, of which the following is a specification.

This invention relates to a device to be attached to the side of a baling-press for the purpose of tying the ends of the wires that bind the bales; and the form of tie made by my said bale-tying attachment is represented and described in my Patent of April 11, 1876, for improvement in bale-ties.

To enable those skilled in the art to which my invention belongs to make and use the same, I will proceed to describe it more in detail, reference being had to the accompanying drawings, forming a part of this specification, and in which—

Figure 1:
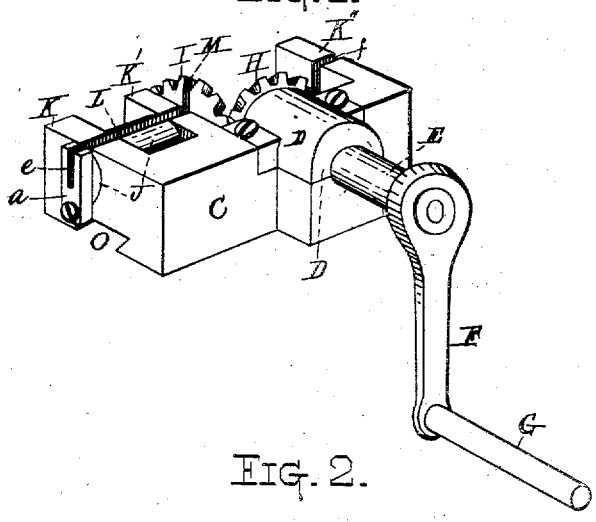
Figure 2:
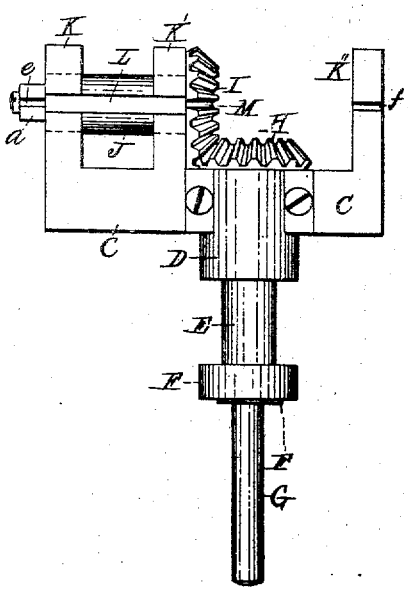

Figure 1 represents a perspective view of the attachment ready to be attached to the side of the baling-press. Fig. 2 represents a top or plan view of the device shown in Fig. 1. Fig. 3 represents an end view of the bale-tying attachment as it appears when attached to a bar on the side of the press. Fig. 4 represents, partly in section, an end view on line A B, Fig. 3, looking in the direction of arrow 1, same figure; and Fig. 5 represents the form or manner in which the ends of the wire are locked and tied together with my said device.

In the drawings, the part marked C represents a frame fitted with a box, D, to receive the journal of shaft E, which is operated or revolved by a crank, F, and handle G. Upon the inner end of shaft E is secured a beveled-gear wheel, H, which meshes into a beveled-gear wheel, I, secured to journal or shaft J, fitted to turn in suitable bearings in the arms or projections K K′ upon frame C.

Shaft or journal J is provided with a deep groove, L, extending a little beyond its center, while gear I is provided with a narrow slot, M, on a line with slot L, and extending also beyond its center.

On the side of arm K is attached a button, *a*, having a narrow slot, *e*, corresponding with the slot M in gear I, while arm K″ on the other end of the frame C is provided with a narrow slot, *f*, corresponding with the slots M and *e*. This device is attached to a bar on the side of the press, as indicated in Figs. 3 and 4 of the drawings, it having a dovetailed groove, O, in its bottom for that purpose, and by which construction and arrangement it may be adjusted to the proper position at the side of the bale.

P represents a section of one of the supporting bars or pieces, provided with a dovetailed tongue or piece, Q, upon its upper side, to fit the dovetail groove O in the bottom of the bale-tying attachment, as indicated in the drawings.

In practice, the piece P is made of wood and the tongue-piece Q of iron, and firmly secured to the upper side of the piece P, by means of screws or other suitable devices, in such a manner as to permit the bale-tying attachment to be easily moved or adjusted to the right or left, as occasion may require. One of these bale-tying attachments for each of the three wires usually employed in securing a bale is attached to the side of the press, one above the other.

The operation is as follows: The ends of the wire, being first passed around the bale, are lapped and laid together in the slots and groove above described. The slots, being narrow, hold or gripe the wires, while the groove L in shaft J is made wide enough to permit the wires to rotate and twist together between the slots M and *e*, the same as they do between the slots M and *f*, and by giving the shaft J a few revolutions by means of the hand-crank on shaft E, the wires are twisted firmly together and locked, as indicated in Fig. 5 of the drawings.

By my invention, therefore, the operation of baling hay is greatly facilitated, especially in consequence of the adjustable connection of the machine with its supporting-bar at the side of the press.

It will be understood that the sides of the press-box are provided with slots to enable the operator to arrange the wires in position, and, as before stated, usually three slots are employed, and the bale-tying attachment is supported upon its bar, so as to stand in front of the slot through which the wire is passed which it is to tie, and the operator pulls the ends of the bale-wire toward him, and laps them in the slots and groove, as before explained, when, by the hand-crank of the device, he rotates gear I and its shaft J, and forms the twists R R, one on each side of the lap S, which is held in the narrow slot M in gear I, and rotates with gear I, the laps T T being held by narrow slots *e* and *f*. After the twists and lock have been made, shaft J is turned to bring its groove L in line with the slots *e* and *f*, when the operator lifts the locked ends out, and the tie is complete.

The lateral adjustment of the device is all important, since the wires cannot always be drawn exactly to a uniform position, while the bale itself, in some classes of presses, particularly the patented perpetual press, is moving, or moves more or less, during the operation of tying the ends of the wires; and unless the tying attachment can be easily moved along, the lapped ends are liable to be displaced, and the tie or lock rendered imperfect, if not wholly destroyed; but with my adjustable device or bale-tying attachment, provided with a dovetail bar-connection or bar-attaching part, which permits the device to be moved easily on the bar P, while at the same time it is held in proper position, all these difficulties are overcome and obviated.

Having described my improvement in bale-tying attachments for baling-presses, what I claim as my invention, and desire to secure by Letters Patent, is—

1. The above-described device, consisting of the frame C, having arms K, K′, and K″; the shaft J, having the groove L, connected with the slots *e* M *f*, and the bevel-gears H I, the shaft E, and crank F, all constructed, combined, and operating substantially as and for the purpose specified.

2. The combination, in a bale-tying machine, of a slotted twisting-gear, with a shaft attached, provided with a groove or slot of sufficient width to permit the lapped ends of the wires being twisted together therein.

3. The combination, with supporting-frame C, of operating crank-shaft E and its gear H, of the slotted gear I, its attached grooved shaft J, and slotted stand or button *a*, substantially as and for the purposes set forth.

4. A bale-tying attachment for baling-presses, provided with a dovetail bar-connection or bar-attaching part, for the purposes stated.

STACY D. PURDY.

Witnesses:
W. L. FAY,
P. H. BOYNTON.